US011862909B2

(12) United States Patent
Xiao

(10) Patent No.: US 11,862,909 B2
(45) **Date of Patent: *Jan. 2, 2024**

(54) RADIO-FREQUENCY COAXIAL CONNECTOR

(71) Applicant: RESERCH ON ELECTRICAL APPLIANCES OF SHANGHAI ASTRONAUTICS CO. LTD, Shanghai (CN)

(72) Inventor: Shunqun Xiao, Shanghai (CN)

(73) Assignee: RESERCH ON ELECTRICAL APPLIANCES OF SHANGHAI ASTRONAUTICS CO. LTD

(*) Notice: Subject to any disclaimer, the term of this patent is extended or adjusted under 35 U.S.C. 154(b) by 87 days.

This patent is subject to a terminal disclaimer.

(21) Appl. No.: 17/624,814

(22) PCT Filed: Aug. 30, 2019

(86) PCT No.: PCT/CN2019/103698

§ 371 (c)(1),
(2) Date: Jan. 4, 2022

(87) PCT Pub. No.: WO2021/003826

PCT Pub. Date: Jan. 14, 2021

(65) Prior Publication Data

US 2022/0263280 A1 Aug. 18, 2022

(30) Foreign Application Priority Data

Jul. 5, 2019 (CN) ......................... 201910602248.8

(51) Int. Cl.
*H01R 24/44* (2011.01)
*H01R 13/642* (2006.01)

(52) U.S. Cl.
CPC ........... *H01R 24/44* (2013.01); *H01R 13/642* (2013.01)

(58) Field of Classification Search
CPC ...... H01R 24/44; H01R 13/642; H01R 33/18; H01R 33/20; H01R 33/205; H01R 13/22
See application file for complete search history.

(56) References Cited

U.S. PATENT DOCUMENTS 4,917,630 A * 4/1990 Hubbard ................ H01R 24/52 439/675
5,857,866 A 1/1999 Felps
(Continued)

FOREIGN PATENT DOCUMENTS

CN 2513261 Y 9/2002
CN 1618149 A 5/2005
(Continued)

OTHER PUBLICATIONS

International Search Report for corresponding PCT/CN2019/109698 dated Apr. 3, 2020.
(Continued)

*Primary Examiner* — Oscar C Jimenez
*Assistant Examiner* — Paul D Baillargeon
(74) *Attorney, Agent, or Firm* — Barnes & Thornburg LLP

(57) ABSTRACT

A radio-frequency coaxial connector, comprising a radio-frequency plug and a radio-frequency socket. The radio-frequency plug comprises a tubular plug outer conductor, a plurality of first conductor plates are axially arranged inside the plug outer conductor along the plug outer conductor, and a second conductor plate is fixedly provided at the central axis of the plug outer conductor. The radio-frequency socket comprises a tubular socket shell, a front end of the socket shell is provided with a first slot matching a first conductor plate, a tuning fork-shaped socket inner conductor is provided at the central axis of the socket shell, the head end of the socket inner conductor is provided with a second slot matching the second conductor plate, and an insulation
(Continued)

sleeve is filled between the tail part of the socket inner conductor and the inner wall of the socket shell.

7 Claims, 4 Drawing Sheets

(56) References Cited

U.S. PATENT DOCUMENTS

| | | | | |
|---|---|---|---|---|
| 5,879,188 | A * | 3/1999 | Clyatt .................... | H01R 24/50 439/675 |
| 5,879,198 | A | 3/1999 | Sekimori et al. | |
| 7,553,185 | B1 | 6/2009 | Qu et al. | |
| 2003/0104723 | A1 | 6/2003 | Laub et al. | |
| 2004/0161972 | A1 | 8/2004 | Laub et al. | |
| 2012/0034817 | A1 | 2/2012 | Plate et al. | |

FOREIGN PATENT DOCUMENTS

| | | | |
|---|---|---|---|
| CN | 101809825 | A | 8/2010 |
| CN | 110277705 | A | 9/2019 |
| DE | 102013005106 | B3 | 7/2014 |
| EP | 3455908 | A1 | 3/2019 |
| JP | 2002134236 | A | 5/2002 |
| JP | 2005529449 | A | 9/2005 |

OTHER PUBLICATIONS

Written Opinion for corresponding PCT/CN2019/109698 dated Apr. 30, 2020.
European Patent Office; Intention to Grant corresponding to EP 19 936 926.5-1201 dated Nov. 22, 2022.
Japanese Patent Office; Intention to Grant corresponding to JP 2022-500759.
European Patent Office; Supplemental European Search Report corresponding to EP 19 936 926 dated Jul. 7, 2022.

* cited by examiner

RADIO-FREQUENCY COAXIAL CONNECTOR

CROSS-REFERENCE TO RELATED APPLICATIONS

The present utility patent application is a national stage application of PCT/CN2019/103698, entitled RADIO-FREQUENCY COAXIAL CONNECTOR, filed on Aug. 30, 2019, the contents of which are hereby incorporated by reference in their entirety, including but without limitation, those portions concerning radio frequency connectors.

TECHNICAL FIELD

The present application relates to a radio-frequency coaxial connector, belonging to the technical field of radio-frequency connectors.

BACKGROUND ART

The radio-frequency coaxial connector is generally regarded as a device attached to a cable or installed on an instrument, as a device for electrically connecting or separating transmission lines.

During the use of the existing radio-frequency coaxial connector, if the radio-frequency plug and the radio-frequency socket are not plugged in place, that is, an error exists between the actual plug-in position of the radio-frequency plug and the radio-frequency socket and the complete plug-in position of the radio-frequency plug and the radio-frequency socket. For example, as for a single radio-frequency transmission line, the radio-frequency coaxial connector is mainly in the incomplete plugging, so that the impedance at the radio-frequency coaxial connector can reach 70-800. For example, if there is an error of 3 mm between the actual plug-in position and the complete plug-in position of the radio-frequency coaxial connector, then the impedance at the radio-frequency coaxial connector can reach 800, which is far greater than 500. A skin effect exists in high-frequency high-speed lines. In the industry, it has long been proven that when the impedance is 500, the loss for the skin effect is smallest. In terms of electrical performances, the dielectric thickness required for 500 impedance is 3-4MIL, which can also effectively reduce interference. Because the dielectric thickness is small, the smaller the distance between the signal and the reference plane is, the smaller the interference to adjacent signals is.

Therefore, during the use of the existing radio-frequency coaxial connector, the radio-frequency plug and the radio-frequency socket must be in completely plug-in connection, otherwise the signal transmission will be easily affected. However, in high-frequency high-speed lines, radio-frequency transmission lines are usually in large numbers and distributed in arrays, such that a plurality of radio-frequency coaxial connectors are usually integrated. The radio-frequency plug and radio-frequency socket in a single radio-frequency coaxial connector are easy to be completely plugged. However, when plug-in operation for a plurality of radio-frequency coaxial connectors are performed at the same time, the phenomenon easy to happen is that the radio-frequency plugs and the radio-frequency sockets in several radio-frequency coaxial connectors are not completely plugged, which makes it necessary to carry out multiple times of debugging, adjustments, re-plugging and other operations in the future. Not only the operation is troublesome, but also it is easy to cause damage to the signal transmission.

SUMMARY

In view of the deficiencies in the prior art, the present application provides a radio-frequency coaxial connector. The specific technical solutions are as follows.

A radio-frequency coaxial connector comprises a radio-frequency plug and a radio-frequency socket matching the radio-frequency plug, wherein the radio-frequency plug comprises a tubular plug outer conductor, and the plug outer conductor is axially provided therein with a plurality of first conductor plates along the plug outer conductor, an inside edge of each of the first conductor plates is connected integrally with the plug outer conductor, and an outside edge of each of the first conductor plates is arranged inside the plug outer conductor, a second conductor plate is fixedly provided at a central axis of the plug outer conductor, and a gap is provided between an outside wall of the second conductor plate and an inside wall of the plug outer conductor; the radio-frequency socket comprises a tubular socket shell, and an front end of the socket shell is provided with a first slot matching a first conductor plate, a tuning fork-shaped socket inner conductor is provided at a center axis of the socket shell, a head end of the socket inner conductor is provided with a second slot matching a second conductor plate, and an insulation sleeve is filled between a tail part of the socket inner conductor and an inner wall of the socket shell.

As a further optimized and improved technical solution based on the above technical solution, an inner wall of a front end of the plug outer conductor is provided with an inner conical-surface structure, and an inner wall of a front end of the socket shell is provided with an outer conical-surface structure.

As a further optimized and improved technical solution based on the above technical solution, the second conductor plate and the second slot are in clearance fit.

As a further optimized and improved technical solution based on the above technical solution, the first conductor plate and the first slot are in clearance fit.

As a further optimized and improved technical solution based on the above technical solution, a front end of the socket shell and a front end of the plug outer conductor are in clearance fit.

As a further optimized and improved technical solution based on the above technical solution, the first conductor plates are provided in number of two, and central axes of the two first conductor plates and a central axis of the second conductor plate are coplanar with each other.

As a further optimized and improved technical solution based on the above technical solution, a width direction of the second conductor plate and a width direction of the socket inner conductor are perpendicular to each other.

The beneficial technical effects of the present application are as follows.

When the radio-frequency plug is plugged into the radio-frequency socket in the radio-frequency coaxial connector, even if the radio-frequency plug is not plugged into the radio-frequency socket in place, the error between the actual plug-in position of the radio-frequency plug and the radio-frequency socket and the complete plug-in position of the radio-frequency plug and the radio-frequency socket is less than 3 mm, the impedance change between the radio-frequency plug and the radio-frequency socket is small, and the signal transmission is almost free from interference; the radio-frequency coaxial connector has high fault tolerance and is suitable for large-scale synchronization applications. The plugging and pulling operations are simple and convenient, and the signal transmission is not easy to be damaged; and the radio-frequency coaxial connector has broad application prospects and important application value in high-tech fields, such as electronic information.

DETAILED DESCRIPTION OF EMBODIMENTS

Figure 1:
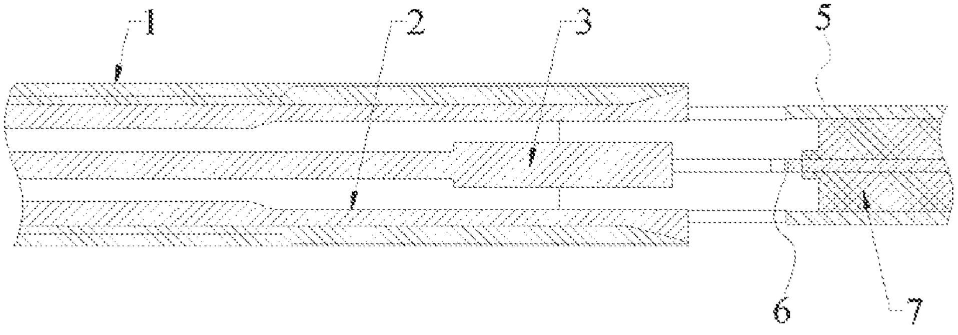
FIG. 1 is a schematic diagram of the radio-frequency coaxial connector of the present application when being connected.
Figure 2:
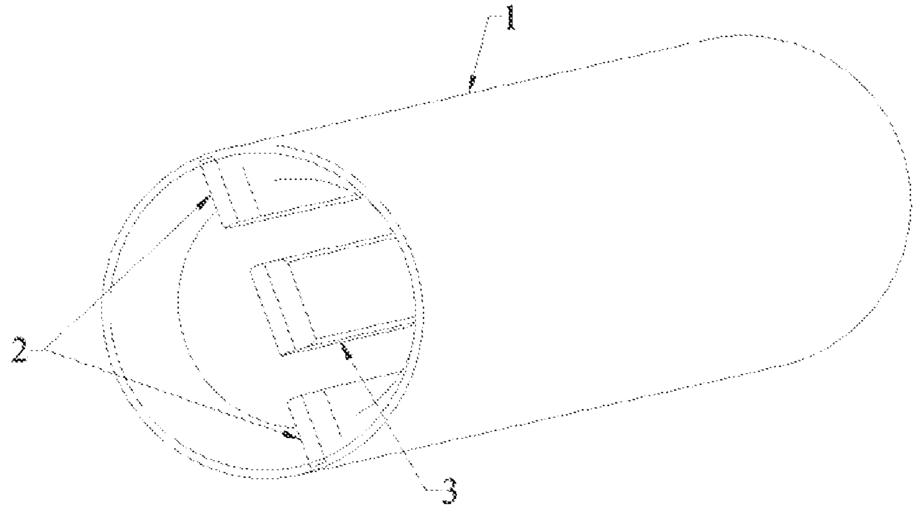
FIG. 2 is a schematic structural diagram of the radio-frequency plug of the present application.
Figure 3:
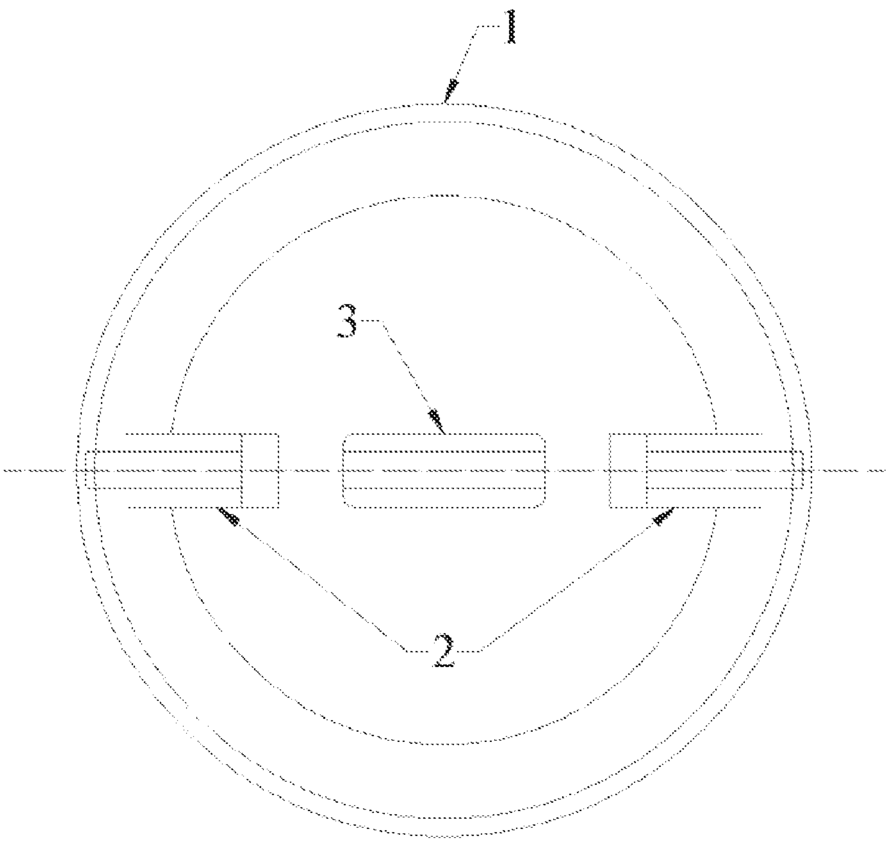
FIG. 3 is a schematic structural diagram of the radio-frequency plug of the present application (being in a front view state)
Figure 4:
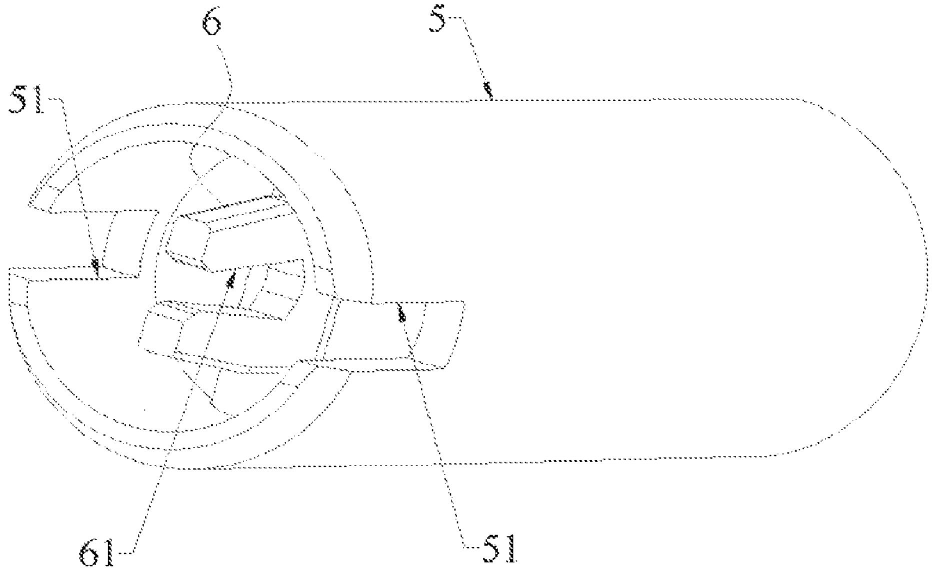
FIG. 4 is a schematic structural diagram of the radio-frequency socket of the present application.

In order to make the objectives, technical solutions, and advantages of the present application clearer, the present application is further described in detail with reference to the drawings and embodiments as follows. It should be understood that the embodiments described here are only intended to explain the present application, but not used to limit the present application.

In the description of the present application, it should be noted that, unless otherwise stated, "plurality" means two or more; orientations or positional relations, indicated by the terms "upper", "lower", "left", "right", "inside", "outside", "front end", "rear end", "head part", "tail part" and the like, are based on the orientation or positional relation shown in the drawings, which is only used for obtaining the convenience of describing the present application and simplifying the description, rather than indicating or implying that the pointed device or element must be in the specific orientation, or be constructed and operated in the specific orientation, and therefore they cannot be understood as a limitation to the present application. In addition, the terms "first", "second", "third", and etc. are only used for the purpose of description, and cannot be understood as indicating or implying the importance of relativity.

In the description of the present application, it should be noted that the terms "install", "link", and "connect" should be understood in a broad sense unless otherwise clearly specified and limited. For example, it can be the fixed connection or detachable connection, or the integral connection. It can be a mechanical connection or an electrical connection. It can be a direct connection or an indirect connection through an intermediate medium. It can be the internal communication between two devices. For those ordinarily skilled in the art, the specific meaning of the above-mentioned terms in the present application can be understood in specific situations.

As shown in FIGS. 1 to 6, the radio-frequency coaxial connector comprises a radio-frequency plug and a radio-frequency socket coaxially arranged with the radio-frequency plug. The coaxial arrangement here means that the central axis of the radio-frequency plug is in collineation with the central axis of the radio-frequency socket. The radio-frequency plug and the radio-frequency socket are movably linked in a plug-in manner. The radio-frequency plug comprises a tubular plug outer conductor 1, and the plug outer conductor 1 is provided therein with a plurality of the first conductor plates 2 along the axial direction of the plug outer conductor 1. The first conductor plate 2 is a plate-shaped conductor. The inside edge of the first conductor plate 2 is integrally connected to the plug outer conductor 1, and the outside edge of the first conductor plate 2 is arranged inside the plug outer conductor 1. The inside edge of the first conductor plate 2 is the side of the first conductor plate 2 that is connected with the plug outer conductor 1, and the outside edge of the first conductor plate 2 is the side opposite to the inside edge of the first conductor plate 2. The second conductor plate 3 is fixedly provided at the central axis of the plug outer conductor 1, and the second conductor plate 3 is also a plate-shaped conductor. The second conductor plate 3 is arranged coaxially with the plug outer conductor 1. The second conductor plate 3 is arranged inside the plug outer conductor 1. There is a gap is provided between the outside wall of the second conductor plate 3 and the inside wall of the plug outer conductor 1. The radio-frequency socket comprises a tubular socket shell 5. The front end of the socket shell 5 is provided with a first slot 51 matching the first conductor plate 2. A tuning fork-shaped socket inner conductor 6 is provided at the center axis of the socket shell 5. The tuning fork shape is similar to a Y-shaped structure. The head end of the socket inner conductor 6 is provided with a U-shaped second slot 61 matching the second conductor plate 3. An insulation sleeve 7 is filled between the tail part of the socket inner conductor 6 and the inner wall of the socket shell 5.

Figure 5:
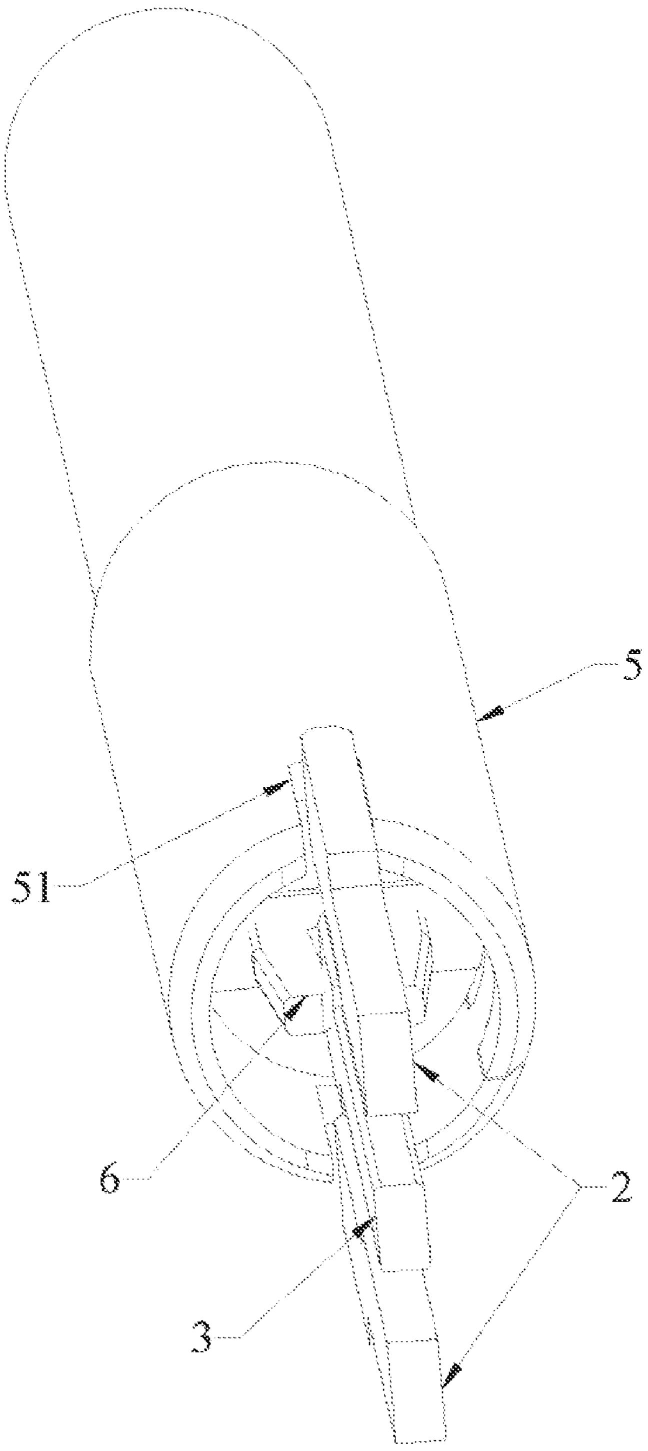
FIG. 5 is a schematic diagram of the connection of the first conductor plate, the second conductor plate and the radio-frequency socket according to the present application.
Figure 6:
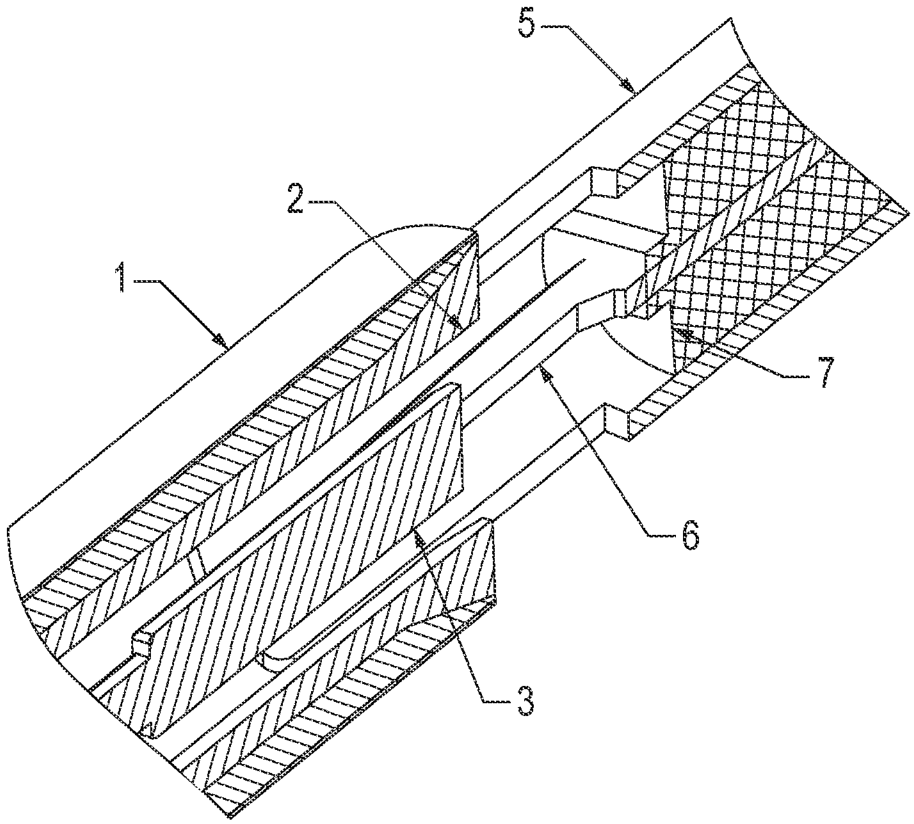
FIG. 6 is a schematic diagram of the connection between the radio-frequency plug and the radio-frequency socket of the present application.

When the radio-frequency plug is plugged into the radio-frequency socket, the front end of the radio-frequency plug is inserted into the front end of the radio-frequency socket. At this time, the first conductor plate 2 will be inserted to the first slot 51, and at the same time, the second conductor plate 3 will be inserted to the U-shaped second slot 61 in the tuning fork-shaped socket inner conductor 6. The front end of the socket shell 5 is inserted to the plug outer conductor 1, as shown in FIGS. 5 and 6. In the above process, the socket shell 5 is an outer conductor, and the socket shell 5 is in contact with the plug outer conductor 1 to be electrically connected. The first conductor plate 2 is in contact with the socket shell 5 to be electrically connected, and the first conductor plate 2 is electrically connected to the plug outer conductor 1 as well. Therefore, the socket shell 5 and the first conductor plate 2 are electrically connected to each other. The second conductor plate 3 is fixedly installed inside the plug outer conductor 1. There is no contact between the second conductor plate 3 and the plug outer conductor 1. The second conductor plate 3 is electrically connected to the socket inner conductor 6, and the socket inner conductor 6 is, through the insulation sleeve 7, separated from the socket shell 5. Therefore, the second conductor plate 3 and the socket inner conductor 6 are electrically connected to form the first parallel plate in the parallel plate capacitor. The socket shell 5, the first conductor plate 2 and the plug outer conductor 1 are electrically connected to each other, to form the second parallel plate of the parallel plate capacitor. According to the formula of the parallel plate capacitance, it can be known that the relationship of the capacitance C and the direct facing area S of the polar plates and the distance d of the polar plates is: the capacitance C is positively proportional to the S, and the capacitance C is inversely proportional to the d. In the process of making the radio-frequency plug and the radio-frequency socket plugged in each other, after the radio-frequency plug and the radio-frequency socket are completely plugged, the end portion of the second conductor plate 3 is inserted to the bottom of the second slot 61, as a standard. When the plugging is not in place, that is, the end portion of the second conductor plate 3 is not in contact with the bottom of the second slot 61, and at this time, even if being not completely contacted, there is a gap between the end portion of the second conductor plate 3 and the bottom of the second slot 61, when the gap is not more than 3 mm, due to the matching structure of the second conductor plate 3 and the socket inner conductor 6 and the matching structure of the socket shell 5, the first conductor plate 2 and the plug outer conductor 1, the socket shell 5 and the plug outer conductor 1 are in shape of round tube, and moreover the width direction of the second conductor plate 3 and the width direction of the socket inner conductor 6 are perpendicular to each other, after the second conductor plate 3 is inserted to the second slot 61 in the socket inner conductor 6, the projections, which are projected by the second conductor plate 3 and the socket inner conductor 6 onto the axial direction of the second conductor plate 3 or the axial direction of the socket inner conductor 6, are cross-shaped, that is, in the parallel plate capacitor C composed of the first parallel plate and the second parallel plate, the first conductor plate 2, the second conductor plate 3, the socket inner conductor 6 are arranged at equal spacing from the socket shell 5 and the plug outer conductor 1. The direct-facing area S of the polar plates is always in a fixed and constant state. The distance d of the polar plates is ultimately determined by the cross-shaped structure between the second conductor plate 3 and the socket inner conductor 6. In this structure, the polar plate distance d between the second conductor plate 3 and the socket inner conductor 6 has a small change, and the change of the capacitance C is very small. Finally, change of the impedance between the radio-frequency plug and the radio-frequency socket is not large, and the signal transmission loss is small. Herein, the opening size of the second slot 61 is smaller than the bottom size of the second slot 61, such that the second slot 61 has elasticity and can better make electrical contact with the second conductor plate 3.

Further, in order to facilitate the plug-in connection, the inner wall of the front end of the plug outer conductor 1 is provided with an inner conical-surface structure, and the inner wall of the front end of the socket shell 5 is provided with an outer conical-surface structure. The front end of the plug outer conductor 1 is the end that is plugged in the radio-frequency plug; and similarly, the front end of the socket shell 5 is the end that is plugged in the radio-frequency socket.

Further, in order to facilitate the plug-in connection, a clearance fit is provided between the second conductor plate 3 and the second slot 61.

Further, in order to facilitate the plug-in connection, a clearance fit is provided between the first conductor plate 2 and the first slot 51.

Further, a clearance fit is provided between the front end of the socket shell 5 and the front end of the plug outer conductor 1.

Further, the number of the first conductor plates 2 is set as two, and the central axes of the two first conductor plates 2 and the central axis of the second conductor plate 3 are coplanar with each other. In the same way, since the first conductor plates 2 are in one-to-one correspondence to the first slots 51, and the second conductor plates 3 are in one-to-one correspondence to the second slots 61. The number of the first slots 51 is set as two, and the central axes of the two first slots 51 and the central axis of the second slot 61 are coplanar with each other. In the above arrangement, on one hand, it is more convenient to plug the radio-frequency plug in the radio-frequency socket, and on the other hand, it is helpful to further reduce the change of the distance d of polar plates.

In the above embodiment, when the radio-frequency plug and the radio-frequency socket are plugged in, since the plug-in structure between the radio-frequency plug and the radio-frequency socket is of equal interval arrangement, even if the radio-frequency plug and the radio-frequency socket are not plugged in place, for example, in the present application, even if the error between the actual plug-in position of the radio-frequency plug and the radio-frequency socket and the complete plug-in position of the radio-frequency plug and the radio-frequency socket reaches 3 mm, the impedance between the radio-frequency plug and the radio-frequency socket is 50±0.5Ω. That is to say, in the present application, the error between the actual plug-in position of the radio-frequency plug and radio-frequency socket and the complete plug-in position of the radio-frequency plug and radio-frequency socket is 0-3 mm, and the change of the impedance between the radio-frequency plug and the radio-frequency socket is ±0.5Ω. The impedance change is very small, which can significantly reduce interference. Therefore, when the radio-frequency coaxial connector of the present application is applied in a large scale and when a plurality of radio-frequency coaxial connectors are plugged in at the same time, even if the phenomenon of incomplete plug-in exists in the radio-frequency plugs and radio-frequency sockets in several radio-frequency coaxial connectors, as long as the error is less than 3 mm, the impedance change is very small, and the signal transmission is almost undisturbed, such that the multiple times of operations, such as, debugging, adjustment, re-plugging and etc., are not necessary to be performed in the future. Not only the operation is convenient, but also it is not easy to cause the damage to the signal transmission. The radio-frequency coaxial connector of the present application has broad application prospects and important application value in high-tech fields, such as electronic information.

The foregoing descriptions are only preferred embodiments of the present application and not intended to limit the present application. Any modifications, equivalent replacements and improvements made within the spirit and principle of the present application shall be included in the protection scope of the present application.

What is claimed is:

1. A radio-frequency coaxial connector, comprising a radio-frequency plug and a radio-frequency socket matching the radio-frequency plug, wherein the radio-frequency plug comprises a tubular plug outer conductor, and the plug outer conductor is axially provided therein with a plurality of first conductor plates along the plug outer conductor, an inside edge of each of the first conductor plates is connected integrally with the plug outer conductor, and an outside edge of each of the first conductor plates is arranged inside the plug outer conductor, a second conductor plate is fixedly provided at a central axis of the plug outer conductor, and a gap is provided between an outside wall of the second conductor plate and an inside wall of the plug outer conductor; and the radio-frequency socket comprises a tubular socket shell, and an front end of the socket shell is provided with a first slot matching a first conductor plate, a tuning fork-shaped socket inner conductor is provided at a center axis of the socket shell, a head end of the socket inner conductor is provided with a second slot matching a second conductor plate, and an insulation sleeve is filled between a tail part of the socket inner conductor and an inner wall of the socket shell.

2. The radio-frequency coaxial connector according to claim 1, wherein an inner wall of a front end of the plug outer conductor is provided with an inner conical-surface structure, and an inner wall of a front end of the socket shell is provided with an outer conical-surface structure.

3. The radio-frequency coaxial connector according to claim 1, wherein the second conductor plate and the second slot are in a clearance fit.

4. The radio-frequency coaxial connector according to claim 1, wherein the first conductor plate and the first slot are in a clearance fit.

5. The radio-frequency coaxial connector according to claim 1, wherein a front end of the socket shell and a front end of the plug outer conductor are in a clearance fit.

6. The radio-frequency coaxial connector according to claim 1, wherein the first conductor plates are provided in number of two, and central axes of the two first conductor plates and a central axis of the second conductor plate are coplanar with each other.

7. The radio-frequency coaxial connector according to claim 1, wherein a width direction of the second conductor plate and a width direction of the socket inner conductor are perpendicular to each other.

* * * * *